May 18, 1948. G. N. PHELPS 2,441,841
EXHAUST TUBE ASSEMBLY
Filed Dec. 6, 1946

Inventor
George N. Phelps
By William A. Zalesak
Attorney

Patented May 18, 1948

2,441,841

UNITED STATES PATENT OFFICE 2,441,841

EXHAUST TUBE ASSEMBLY

George N. Phelps, Lancaster, Pa., assignor to Radio Corporation of America, a corporation of Delaware Application December 6, 1946, Serial No. 714,614

8 Claims. (Cl. 250—27.5)

My invention relates to the exhaust and sealing off of evacuated vessels such as electrical discharge devices and more particularly to a glass stem having embedded in the glass a copper exhaust tube closed vacuum tight by a cold or pressure weld close to the glass.

The conventional glass exhaust tube sealed off by fusion has some disadvantages, particularly for large electrical discharge devices such as cathode ray tubes. The joint between the glass exhaust tube and the glass stem is not particularly strong, and considerable loss occurs from breakage on production equipment and by careless handling. Exhaust tubes of large diameter, such as three-eighths of an inch and larger, permit high pumping speed and reduction in time of exhaust of large evacuated devices such as cathode ray tubes. Large diameter glass exhaust tubes are extremely difficult to seal and tip by fusion, an operation which must be done by hand. The operator must undergo a long training period to acquire the skill and technique necessary to seal off the large diameter exhaust tubes and to anneal the tip after sealing off. The fusion sealing of the glass exhaust tube causes the evolution of large quantities of gas from the hot glass and this gas goes back into the evacuated envelope and raises the pressure in the envelope after the exhaust tube is sealed.

Metal exhaust tubes sealed into the glass wall or glass stem of the device avoid some of the disadvantages of glass exhaust tubes, particularly when the metal exhaust tube is of large diameter and is sealed vacuum tight by a cold or pressure weld obtained by pinching the metal exhaust tube between rounded jaws with sufficient pressure to cause the metal between the jaws to flow and consolidate in the region of greatest pressure into a homogeneous mass forming a vacuum tight weld. The metal exhaust tubes may be of large diameter, thereby increasing the pumping speed and decreasing the time of exhaust and may be sealed off automatically without attention of an operator by pinching the tube closed without heat so that no gas is released during the sealing off operation. The metal exhaust tube may also be smaller than a glass exhaust tube giving the same pumping speed. Because of the inherently greater strength of the copper tube the wall can be much thinner than that of a glass tube and still have as large or larger inner diameter.

Some of the common glass sealing alloys or metals which have the properties and thermal coefficient of expansion such that a good hermetical seal can be made between the glass and the metal, can be made into exhaust tubing, and a simple way to provide a glass stem with a metal exhaust tube would be to seal an exhaust tube of glass sealing metal directly into the glass stem. This simple procedure presents many difficulties and disadvantages and is expensive. It has been found that tubing made of these available alloys, for example, alloys containing chromium, iron, and nickel, are work hardened when the tube is pinched between the rounded jaws used for pressure welding, and that the tubing is deformed by the pinching for a considerable distance from the point of pinch. For example, it has been found that if an exhaust tube of chrome-iron alloy is sealed into a glass stem the pinch for producing a cold or pressure weld to seal the tube must be for ¼" size and more for larger sizes at least an inch or more away from the glass as otherwise the unavoidable deformation of the exhaust tube produces undesirable stresses and strains at the glass to metal seal. Also, all of the glass sealing alloys oxidize during the heating necessary to seal the glass sealing alloy tube into the glass, and for this and other reasons the sealing of such a tube vacuum tight by a cold or pressure weld is uncertain and difficult, and requires exceedingly high pressures which affects maintenance of equipment, safety, and requires materials that will stand such pressures.

An exhaust tube of copper can be sealed vacuum tight by a cold or pressure weld with comparative ease and certainty, but a copper exhaust tube having the necessary wall thickness does not form a hermetical seal with glass merely by being embedded in the glass. A copper tube can be sealed into a mass of glass by means of the knife edge or Housekeeper type of seal disclosed in U. S. patent, Houskeeper, 1,293,441, February 4, 1919, in which a disc with a sharpened edge has the glass welded to the sides of the disc and around the sharp or knife edge. It has been found that this type of seal between a copper tube and a mass of glass is expensive to make, and is not feasible for high production stems of the disc or button type commonly used for cathode ray tubes and similar devices, as such seals are expensive to make, require close control and do not have the necessary mechanical strength.

The principal object of my invention is to make feasible the hermetical sealing into glass of an exhaust tube which can be sealed vacuum tight by a cold pressure weld close to the glass without endangering the glass to metal seal.

Another object is to provide an assembly in which an exhaust tube of metal, such as copper, which is easily and safely sealed vacuum tight by a cold pressure weld process, is combined with a sleeve of a glass sealing alloy sealed into a disc type glass stem and the glass to metal seal is effectively isolated from stresses resulting from deformation of the exhaust tube by the pinching and mechanical working of the exhaust tube during the making of a cold pressure weld as close to the glass as is mechanically feasible.

In accordance with my invention, I secure the exhaust tube to the bias stem by brazing or welding to a sleeve of glass sealing alloy embedded in the glass one end of the exhaust tube with the remainder of the exhaust tube out of contact with the sleeve, this brazed or welded joint being displaced from the glass far enough to isolate the glass to metal seal from stresses and strains arising from such deformation of the exhaust tube as may occur during the cold or pressure welding process, and to exert no influence on the expansion characteristics of the sealing alloy.

In the preferred construction, a tubular sleeve of glass sealing alloy, with its side wall sealed to the glass of a disc type stem along an annular zone a short distance from one end, loosely surrounds a copper exhaust tube joined by brazing or welding to said one end only of the sleeve and extending beyond the other end of the sleeve with a cold or pressure weld made as close to the glass as is mechanically feasible. Deformation of the copper exhaust tube arising from the cold welding process and extending from the weld to a zone within the tubular sleeve of glass sealing alloy does not extend beyond the joint between the exhaust tube and the tubular sleeve embedded in the glass and thus exerts no stress or strain on the glass to metal seal.

For a better understanding of my invention reference may be had to the following specification taken in connection with the accompanying drawing in which merely for purposes of illustration I have described and shown one embodiment of my invention and in which.

Figure 1:
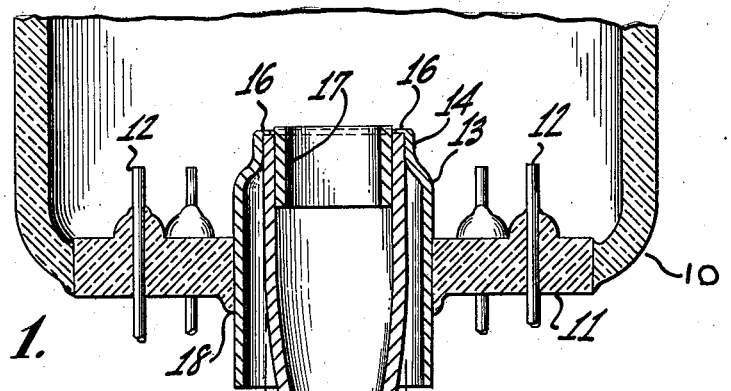
Fig. 1 is a longitudinal section through a glass stem of the conventional disc or button type constructed in accordance with my invention, with a metal exhaust tube hermetically sealed or welded close to the glass button or disc.

In the embodiment of my invention shown in the drawing, the bulb or envelope 10 of the discharge device, such as a cathode ray tube, has sealed into it to form a part of the wall of the tube a glass stem, preferably of the type having a circular glass disc or button 11 molded in the conventional way with leads 12 usually arranged in a circle concentric with the disc and extending through the disc or button 11 which is to advantage made of the soda lime glass generally used for bulbs of incandescent lamps and radio tubes.

The exhaust tube assembly, by means of which in accordance with my invention the copper exhaust tube is secured to the glass disc or button 11, comprises a sleeve 13 of a glass sealing alloy or metal embedded in and extending through the disc or button 11, and hermetically sealed to the glass at an annular sealing zone intermediate the ends of the sleeve and displaced to some extent from the open inner end of the sleeve. As shown in the drawing, the sleeve 13 is preferably a right cylinder so that a glass to metal seal of considerable extent can be made in the zone where the glass disc 11 is sealed to the sleeve 13.

Preferably, though not necessarily, the sleeve 13 has at the upper or inner end a constriction 14 into which there is fitted the open upper or inner end of a copper exhaust tube 15. The adjoining inner ends of the sleeve 13 and of the copper exhaust tube 15 are hermetically joined to each other, preferably by a welded or brazed joint 16. As the glass to metal seal is below and spaced from the constriction 14 and the joint 16 and the sleeve and exhaust tube are in contact only at the constriction, the thermal expansion of the copper exhaust tube does not interfere with or modify the expansion characteristics of the sleeve 13 at the glass to metal seal. Preferably, where the high frequency induction method of welding is used, an insert ring 17 of nickel or similar metal is fitted into the upper or inner end of the exhaust tube and may to advantage, as indicated in the drawing, project slightly above the inner ends of the exhaust tube and the sleeve 13. Brazing or welding of the copper exhaust tube to the sealing alloy sleeve is conveniently and quickly done by heating the assembly by high frequency induction heating in a reducing atmosphere such as hydrogen. During the brazing or welding by high frequency induction heating the copper exhaust tube is annealed and softened for a short distance from its inner end, the rest of the tube remaining hard. The copper at the extreme inner end of the exhaust tube melts to some extent and the nickel insert ring inside the copper exhaust tube prevents the copper from bubbling during the brazing operation and from flowing into and partially filling the open end of the exhaust tube. The adjoining ends of the sleeve 13 and the copper exhaust tube 15 can be hermetically joined in other ways, as by silver soldering. The welding or brazing by heating the inner ends of the sleeve and the exhaust tube by high frequency induction heating in a hydrogen atmosphere is preferred because it can be done in three or four seconds in one operation, and the melting point of copper, nearly 1100° C., is so much higher than that of silver solder that it does not seriously limit the amount of heat that can be employed in the stem making operation. Silver soldering in a furnace softens most of the copper exhaust tube so that it is easily deformed in later handling and processing.

Figure 2:
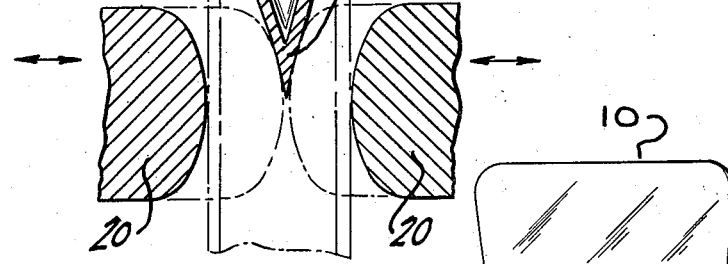
Fig. 2 is a view in elevation of the assembly of the exhaust tube and surrounding sleeve of glass sealing alloy.
Figure 2:
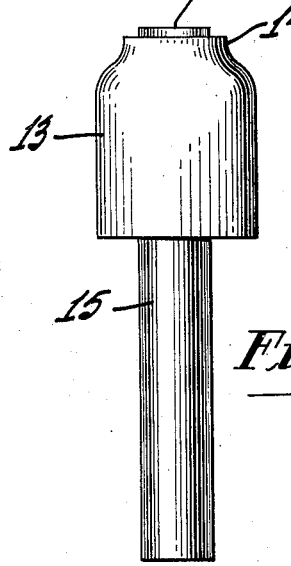

The glass disc or button stem is made by pressing the plastic glass in a mold in accordance with conventional practice. The exhaust tube assembly shown in Fig. 2 is set in the mold, the leads 12 arranged in a circle about it, and the plastic glass is molded and shaped into a disc or button through which the leads extend and in which the sleeve 13 is embedded and secured by a glass to metal seal along a comparatively wide zone of the sleeve. A bead 18 may be formed on the bottom of the disc or button around the sleeve 13 to increase the area of the glass to metal seal and also provide additional mechanical strength.

When the device having the stem constructed in accordance with my invention is exhausted the walls of the copper exhaust tube are in the position indicated in the dotted lines in Fig. 1 during the pumping. When the desired degree of vacuum is obtained the copper exhaust tube 15 is closed vacuum tight by a cold pressure weld 19 made by pinching the tube as close to the glass stem as is mechanically feasible between two parallel relatively movable pinching jaws 20 shown diagrammatically and moved back and forth by mechanism not shown. In practice, it is convenient to actuate these pinching jaws by hydraulic mechanism.

The pinching jaws have parallel rounded or cylindrical faces which extend transversely of the exhaust tube, and are harder than the metal of the exhaust tube. As the jaws close the part of the exhaust tube between them is flattened and its walls brought into contact. As the jaws continue their closing movement the metal of the exhaust tube caught between the jaws flows to some extent both lengthwise and crosswise of the tube in a weld region dependent in area on the radius of curvature of the jaw faces, and is pressed into a thin sheet which tapers to practically a knife edge in the weld region and having through the area between the jaws when they are fully closed a thickness which is almost zero. It has been found that the copper surfaces in contact in the weld region are consolidated by a vacuum tight pressure weld 19 into a homogeneous mass of copper in which the grain boundaries of one surface are interleaved with the grains of the other surface and which has a greater resistance to rupture by internal hydrostatic pressure in the tube than the walls of the tube. The weld is made while the tube walls are at room temperature so there is no evolution of gas as in fusion welding, and the weld 19 is a true weld which is vacuum tight. This result is achieved as the rounded ends of the pinching jaws move from the full line position to the broken line position where the jaws are practically in contact along the middle line of the jaws. During this movement of the jaws the collapse of the tube 15 due to the pinching together of its walls from the original position shown in dotted lines to that shown in full lines deforms the copper tube so that, as indicated in Fig. 1, its walls are deformed and moved out of their original position for a considerable distance and up to a point within the sleeve 13 and often within the zone of the glass to metal seal. This deformation of the exhaust tube would tend to pull the wall of the sleeve 13 away from the glass and thus endanger the glass to metal seal if the engagement of the exhaust tube and sleeve is not limited to one end of the sleeve and if the deformation of the exhaust tube due to collapse during sealing could be transmitted directly to the wall of the sleeve 13 in the region of the glass to metal seal. The exhaust tube assembly made in accordance with my invention confines the stresses or strains due to deformation of the exhaust tube during sealing to the inner end only of the sleeve 13, and therefore deformation of the exhaust tube has no effect on the glass to metal seal between the sleeve 13 and the glass button. The radius of curvature of the rounded faces of the jaws depends somewhat upon the size and material of the exhaust tube. If the radius of curvature is too small, the jaws will cut off the copper tube before a weld is made, and if it is too great there is not enough flow of the metal caught between the jaws to obtain a good cold pressure weld. For copper tubing of a size suitable for most exhaust tubes the curvature of the faces of the jaws may be about that of steel drill rods about one quarter inch in diameter. With the proper relation between the radius of curvature of the rounded ends of the jaws and the diameter of the copper exhaust tube, the vacuum tight weld 19 can be made without heating the walls of the exhaust tube above room temperature.

By my invention, I am able to provide a large diameter metal exhaust tube which can be sealed without heat and very much closer to the glass button than is feasible by other methods. In many cases this short tip for the exhaust tube is of great advantage in reducing the overall length of the completed device.

I have obtained good results with an electrode assembly embedded in and sealed to a button stem about .125" thick and consisting of a sleeve 13 of glass sealing alloy having a wall thickness of .012", an outer diameter about .375", an overall length of about .625", a copper exhaust tube having an outer diameter of about .30" and a wall thickness of about .02" with an insert ring 16 of nickel about .01" thick. With this construction I have been able to make the pinch and vacuum tight pressure weld as close as one-half inch to the glass button 11, which is closer than is feasible with the glass exhaust tube of the same size. The pinch close to the glass button 11 is of importance in tubes which are not based and in which the leads projecting from the stem are used as terminal or connecting pins. It is obvious that by shortening the sealing sleeve 13 the pinch can be made closer to the button, and that by also increasing the clearance between the sleeve and the exhaust tube the pinch can be made almost flush with the outer end of the sleeve.

The mechanical strength of the joint between the metal exhaust tube and the glass button is much greater than that of the joint between a glass exhaust tube and a glass button, and also greater than the strength of a joint made between a copper exhaust tube and a glass button by any other type of seal heretofore used.

Figure 3:
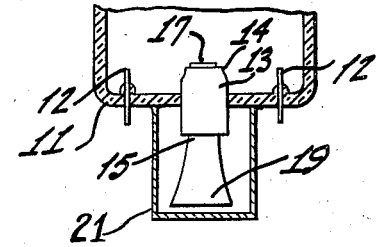
Fig. 3 shows the bulb of an electrical discharge device such as a cathode ray tube with the button stem in section.

As shown in Fig. 3, a cap 21 may be placed over the sharp edge of the weld 19 to prevent injury during handling of the tube.

While certain specific embodiments have been illustrated and described, it will be understood that various changes and modifications may be made therein without departing from the spirit and scope of the invention.

What I claim as new is:

1. A stem for sealed vessels comprising a mass of glass, a sleeve of metal substantially uniform in diameter throughout its length and having a coefficient of thermal expansion for securing a hermetical seal to glass, said sleeve embedded in said mass with its ends open on both sides of said means and hermetically sealed into said mass at a zone spaced from its ends and a copper exhaust tube of smaller diameter and longer than said sleeve telescoped within and concentric with said sleeve with one end open and hermetically joined near its open end to the inner wall of one end only of said sleeve with the remainder of said exhaust tube out of contact with said sleeve and its other end projecting beyond the other end of said sleeve.

2. A stem for evacuated electric discharge devices comprising a glass disc, a cylindrical sleeve of an alloy of the chrome iron class having a coefficient of thermal expansion for securing a hermetic seal to glass and extending through and sealed intermediate its ends into said disc with its inner end projecting from one side of said disc, and a copper exhaust tube longer than said sleeve and of an outer diameter less than the inner diameter of said sleeve positioned inside said sleeve with its open inner end substantially flush with the open end of said sleeve and its wall welded to the inner wall of said sleeve forming a hermetical joint to said projecting end of said sleeve, with the remainder of said exhaust tube out of contact with said sleeve, the other end of said exhaust tube projecting beyond the other end of said sleeve and the other side of said glass disc.

3. A stem for sealed vessels comprising a mass of glass, a sleeve of glass sealing metal embedded in said mass with its inner end open on one side of said mass and hermetically sealed to said mass at a zone spaced from said inner end, and a copper exhaust tube of smaller diameter and longer than said sleeve concentric with and inside said sleeve with its outer wall hermetically joined near its open inner end to the inner wall of the projecting open inner end of said sleeve, and the remainder of said exhaust tube out of contact with said sleeve, said exhaust tube projecting beyond the outer end of said sleeve and the other side of said mass and hermetically sealed close to the outer end of said sleeve by a cold pressure weld in which the walls of said tube are flattened to a sharp edge in the seal region with deformation of the tube by said weld terminating within said sleeve and short of the inner ends of said tube and sleeve.

4. An evacuated vessel having a glass wall, a cylindrical sleeve of glass sealing metal embedded in said wall with its inner end open and projecting above the inner surface of said wall and hermetically sealed to said wall at a zone spaced from said open end, a copper tube of smaller diameter longer than said sleeve telescoped inside and concentric with said sleeve and hermetically joined near its inner open end to the inner wall of said sleeve at the open end thereof with the remainder of said copper tube out of contact with said sleeve, the outer end of said copper tube projecting from the outer end of said sleeve and closed vacuum tight close to the outer end of said sleeve by a flattened seal.

5. An evacuated vessel comprising a bulb having a neck, a stem comprising a glass disc with its edge hermetically sealed to said neck, a cylindrical sleeve of glass sealing metal adapted to secure a hermetical seal with glass embedded in said disc with its inner end open to the interior of said neck and having its wall hermetically sealed to said disc at a zone spaced from said inner end, a copper tube longer than said sleeve telescoped inside and concentric with said sleeve and hermetically joined near its inner open end to the inner wall of said sleeve near the open end thereof, with the remainder of said copper tube out of contact with said sleeve, the outer end of said copper tube projecting beyond the outer end of said sleeve and the outer side of said disc and closed by a vacuum tight seal close to the outer end of said sleeve.

6. A metal exhaust tube assembly comprising a copper exhaust tube open at one end and a cylindrical sleeve shorter and of larger diameter than said exhaust tube and composed of glass-sealing metal adapted to secure a hermetic seal to glass and surrounding throughout its length said exhaust tube and having one end joined vacuum tight to said exhaust tube at the open end of said copper exhaust tube and out of contact with it throughout the remainder of its length.

7. A metal exhaust tube assembly comprising a copper exhaust tube open at one end, a cylindrical sleeve of glass sealing metal shorter and of larger diameter than said exhaust tube surrounding and concentric throughout its length with said exhaust tube, said sleeve having at one end only a constriction which fits snugly over the exhaust tube and is joined vacuum tight to said exhaust tube, said sleeve being throughout the remainder of its length out of contact with said copper exhaust tube.

8. A metal exhaust tube assembly comprising a copper exhaust tube open at one end, a cylindrical sleeve of an alloy of the chrome iron class adapted to secure a hermetic seal with glass and shorter and of larger diameter than said exhaust tube, said sleeve surrounding said exhaust tube and having at one end a constriction which fits the exhaust tube and is joined vacuum tight to said exhaust tube near the open end thereof, and a metal insert ring fitted snugly into the open end of said exhaust tube and extending into said exhaust tube beyond the hermetic juncture of said exhaust tube and said sleeve.

GEORGE N. PHELPS.